Oct. 31, 1972  P. K. RUNGE  3,701,584

TUNED VOLTAGE VARIABLE BIREFRINGENT ACOUSTO-OPTICAL FILTER

Filed Dec. 21, 1970

INVENTOR
P. K. RUNGE
BY David P. Kelley
ATTORNEY

United States Patent Office 3,701,584
Patented Oct. 31, 1972

3,701,584
TUNED VOLTAGE VARIABLE BIREFRINGENT ACOUSTO-OPTICAL FILTER
Peter Klaus Runge, Fair Haven, N.J., assignor to Bell Telephone Laboratories, Incorporated, Murray Hill, N.J.
Filed Dec. 21, 1970, Ser. No. 100,207
Int. Cl. G02f 1/24
U.S. Cl. 350—149       12 Claims

ABSTRACT OF THE DISCLOSURE

A voltage tunable acousto-optical filter with reduced power requirements acts as a bandpass optical filter with its center frequency determined by a DC voltage source. Prior art acousto-optical filters rely on the natural birefringence of the filter crystals, hence a change in the output optical frequency is accomplished by a change in the acoustical frequency established in the crystal. However, the acoustical frequency can be fixed and the output optical frequency changed by varying the birefringence of the crystal with the application of a voltage to a set of electrodes on the crystal.

BACKGROUND OF THE INVENTION

This invention relates to optical filters and, more particularly, to voltage tunable acousto-optical filters.

It has been found that efficient filtering of optical frequencies can be achieved by means of acoustic waves. For example, a stop-band filter for optical beams using acoustic waves can be created by attaching an apertured electro-acoustical transducer to one end of a rectangle of acousto-optic material. The transducer is used to set up acoustic waves in the material which are collinear with a light beam that is directed through the aperture in the transducer and into the acousto-optic material. If the acoustic wave length is adjusted such that it is one-half that of the light wave length, then the periodically varying dielectric constant of the material caused by the acoustic wave establishes a stop band for transmission at the light frequency. This occurs because each variation in the dielectric constant caused by the acoustic wave causes a small reflection of the light wave passing through it. Since the variations have been adjusted to be one-half of a wave length, the reflections of the light add in phase. Therefore, there will be a cumulative effect resulting in substantially complete reflection of the light wave at the frequency selected.

Another method of filtering or phase modulating a light beam with acoustic waves uses a piece of acousto-optic material which has an electrode surrounding the material along its length. The electrode is then driven at the frequency to be filtered. This "squeezes" the material and sets up density variations to the light beam traveling through the center of the material. This density shift along the axial dimension of the material modulates the light or changes its phase in response to the acoustic waves, thereby filtering the frequency of interest from the output light.

In an article entitled "Acousto-Optic Tunable Filter" by S. E. Harris and R. W. Wallace in the Journal of the Optical Society of America, vol. 59, No. 6 (June 1969), a method for creating an optical bandpass filter is disclosed. This method involves passing the light beam through a polarizer and then into a piece of anisotropic acousto-optic material in which a collinear acoustic wave has been established. This acoustic wave interacts with the light beam and causes changes in the polarization, which depends on the frequency content of the light. There is an accumulative effect on one particular optical frequency depending on the acoustic frequency and the birefringence of the material. This accumulative effect for the selected frequency causes it to be rotated into an orthogonal polarization. As the light beams leave the acousto-optic material they are intercepted by an analyzer which has been oriented to pass light which has the orthogonal polarization of the input light to the material. Therefore, only light beams having the selected frequency will pass through the analyzer and the selected frequency can be changed by changing the acoustic frequency.

All of these methods for tuning an optical filter involve a change in the acoustic frequency which interacts with the light beam. Therefore, an electronic oscillator which is tunable is required for these methods. However, if there were a method of tuning an acousto-optical filter without changing the acoustic frequency, the acoustic frequency could be set at one of the resonances of the material. This would reduce the amount of drive power needed and would allow the acoustic material to be incorporated into a regenerative system, such as the one disclosed in the copending application of P. K. Runge, Ser. No. 94,647, filed Dec. 3, 1970 and now U.S. Pat. No. 3,656,068, which issued Apr. 11, 1972. This copending application discloses a self-pulsing acousto-optic modulator which automatically deflects an incident light beam, as opposed to the present invention which filters an incident light beam. The incorporation of the regenerative system will eliminate the need for an external oscillator and thereby reduce the complexity of the external circuitry. It is therefore an object of this invention to reduce the drive power required in an acousto-optic filter, to provide for ease of tuning and to reduce the complexity of the external circuitry.

SUMMARY OF THE INVENTION

The present invention is an acousto-optic filter which is tunable with a voltage source, which has an acoustic frequency fixed at one of the resonances of the acousto-optic material, and which is part of a regenerative system. This allows greater ease in tuning the filter and reduces the complexity of the external circuitry.

In an illustrative embodiment of the invention a light beam is passed through an optical polarizer into a rectangular crystalline block of anisotropic acousto-optic material, such as lithium niobate. This material is provided with electro-acoustical transducers which are used to generate an acoustic wave in the material which is collinear with the polarized light beam traveling through the material. As the two waves travel through the material together, they interact, causing the light beam to be rotated from one polarization to another. This rotation will be cumulative enough to change the light to an orthogonal polarization for one particular frequency. This frequency depends on the acoustic frequency and the birefringence of the crystal. As the light beam leaves the anisotropic material it passes through an optical analyzer. The analyzer is oriented so that it will pass only the output light which has an orthogonal polarization with respect to the input light to the anisotropic material. Since only the light which is at a frequency which meets the proper conditions will be able to pass through the analyzer, the system acts as a bandpass optical filter. The present invention keeps the acoustic frequency constant and varies the birefringence of the crystal to tune the filter. This change in birefringence is accomplished by a change in voltage applied to two electrodes placed along the length of the anisotropic material.

When the acoustic wave is set up in the material by a transducer located on one end of the material and this wave is picked up by a transducer on the other end of the material, a regenerative system is established. To accomplish this, the pick-up transducer is connected to the input of an amplifier and the output of the amplifier is connected to the driving transducer. This converts the amplifier into an oscillator in which the anisotropic material is the feedback path. This system will oscillate at one of the resonances of the crystal, determined by the crystal's length, thereby reducing the power required and eliminating the need for an external oscillator.

The foregoing and other features of the present invention will be more readily apparent from the following detailed description and drawings.

DETAILED DESCRIPTION

Figure 1:
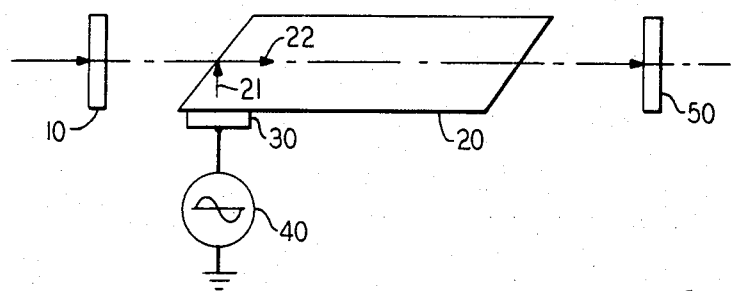
FIG. 1 is a schematic of a prior art acousto-optical tunable filter.

FIG. 1 is a schematic of a prior art acousto-optical tunable filter. The light to be filtered is linearly polarized as it passes through polarizer 10. This polarized light enters the anisotropic material 20. The figure shows the light beam from the polarizer entering the material horizontally, which assumes that the index of refraction for air and the material are the same. However, in practice the light beam either enters the material at a refraction angle or the system is surrounded by an index matching material. Connected to one end of the anisotropic material is an electro-acoustical transducer 30 which is driven by electronic oscillator 40. The transducer sets up longitudinal waves, indicated by arrow 21, in the material which are changed into shear waves, indicated by arrow 22, at the inclined surface in the material. These acoustical shear waves then travel collinearly with the polarized light beam in the material. As these waves travel along together they interact as a result of the photoelastic effect. This effect, which is a result of a perturbation of the elements of the impermeability tensor, tends to diffract the light from one polarization to another. This diffraction will be cumulative enough to cause rotation from the input polarization to an orthogonal one; only if, $$K_o - K_e = K_a \quad (1)$$

where $K_o$ is the ordinary wave vector, $K_e$ is the extraordinary wave vector, and $K_a$ is the acoustic wave vector. This equation depends on the natural birefringence of the crystal and is true only for the small band of frequencies near $$f_o = \frac{c}{v} \frac{1}{|\Delta n|} f_a \quad (2)$$

where $c/v$ is the ratio of the optical velocity in a vacuum to the acoustic velocity in the material, $\Delta n$ is the birefringence of the crystal, and $f_a$ is the acoustic frequency.

As the light beam leaves the anisotropic material it passes through analyzer 50. The analyzer is oriented so that it will pass only the output light which has an orthogonal polarization to the input light. Therefore, only the light which is at or near a frequency satisfied by Equation 2 is able to pass through the analyzer, thereby causing the system to act as an optical bandpass filter. As can be predicted from Equation 2, the frequency output of the filter is changed when the frequency output of the oscillator which generates the acoustic frequency is changed.

Figure 2:
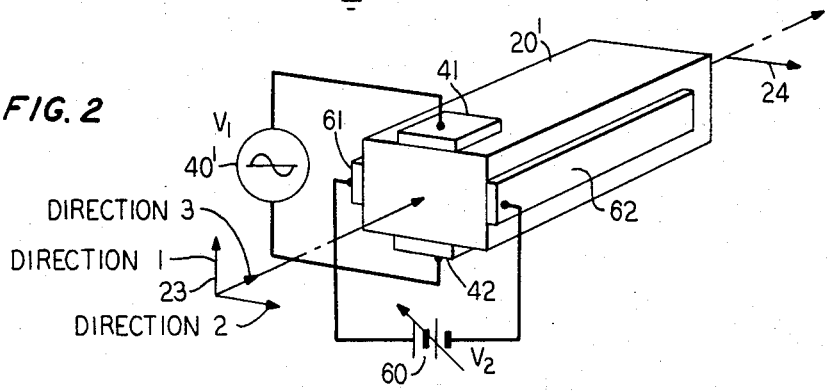
FIG. 2 is a schematic of an illustrative embodiment of the invention.

FIG. 2 is a schematic of an illustrative embodiment of the invention. Those parts of FIG. 2 which have the same function as parts in FIG. 1 have the same number designation but are marked with a prime. The light beam 23, which has been linearly polarized in direction 1, i.e., vertically, enters the block of anisotropic material 20'. An acoustic wave collinear with the light beam is set up in the material by electrodes 41 and 42, which are driven by the electronic oscillator 40'. These electrodes can easily be replaced with an electro-acoustical transducer arranged as shown in FIG. 1 if desired. As previously explained, these waves interact, causing a rotation to an orthogonal polarization for the frequencies satisfying Equation 2. This produces output wave 24, which is polarized in direction 2, i.e., horizontally. The optical frequency of this wave is dependent on the acoustic frequency. However, Equation 2 shows that the output wave also depends on the birefringence of the crystal. Therefore, the output frequencies which will be rotated to an orthogonal polarization and then passed through the output analyzer can be made to depend on the electrically induced birefringence. This electrically induced birefringence is produced by electrodes 61 and 62, which are attached to the sides of the anisotropic material and connected to variable voltage source 60 between them. This produces a change in birefringence $$|\Delta_n| = n_3{}^3 r_{22} E_2 \quad (3)$$

where $E_2$ is the ratio of the voltage of source 60 to the distance between the electrodes, $n_3$ is the index of refraction in direction 3, and $r_{22}$ is the electro-optic coefficient. From Equations 2 and 3 we obtain the value for the output frequency $$f_o = \frac{c}{v} \frac{f_a}{n_3{}^3 r_{22} E_2} \quad (4)$$

The method used to generate the collinear acoustic waves used in practicing the invention depends on the class of crystals selected as the anisotropic material and the crystal orientation. For example, the change in the impermeability tensor corresponding to coupling from direction 1 to direction 2 for crystals of the 3M class is $$\Delta B_6 = p_{14} \xi_5 + \tfrac{1}{2}(p_{11} - p_{12}) \xi_6 \quad (5)$$

where $\xi_5$ is the mechanical shear strain in the 1–3 plane, $\xi_6$ is the mechanical shear strain in the 1–2 plane, and $p_{11}$, $p_{12}$ and $p_{14}$ are the photoelastic coefficients from the tensor matrix. Equation 5 indicates that there are two possibilities for exciting collinear acoustic waves in class 3M crystals. The first method involves the use of transducers to excite longitudinal waves, which are converted to shear waves at the inclined surface, as shown in FIG. 1. This method is represented by the second half of Equation 5. The second method involves the use of electrodes to affect the piezoelectric coefficient $d_{15}$ and thereby excite $\xi_5$. This is represented by the first part of Equation 5 and is given by $$\xi_5 = d_{15} E_1 \quad (6)$$

where $E_1$ is the ratio of the voltage at the driving electrodes (as opposed to the birefringence electrodes) to the distance between them.

Figure 3:
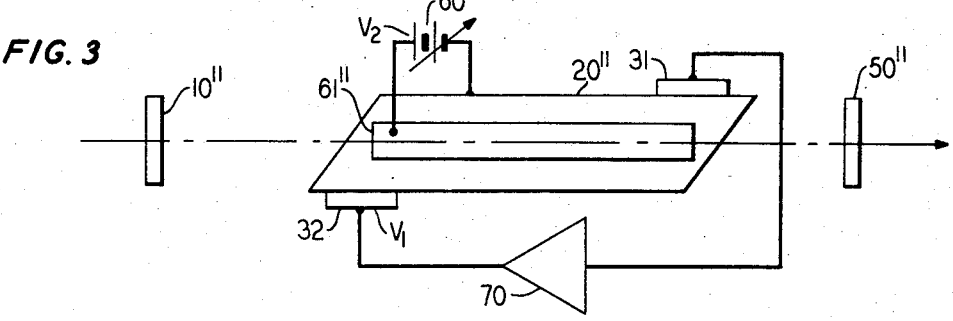
FIG. 3 is a schematic of an illustrative embodiment of the invention in a regenerative system.
Figure 4:
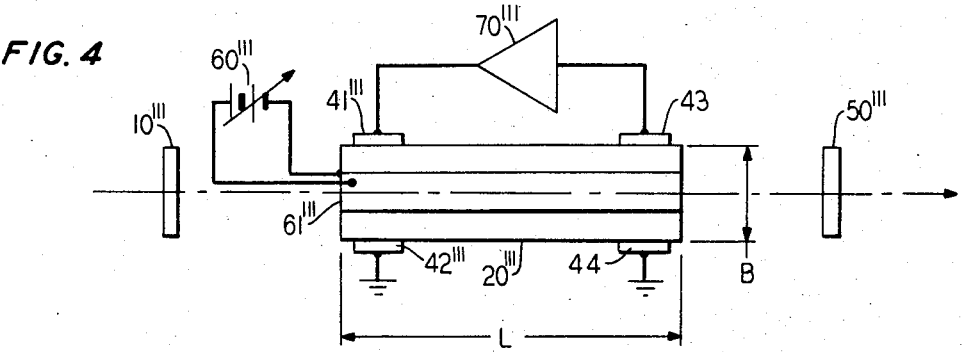
FIG. 4 is a schematic of an illustrative embodiment of the invention without transducers.

When an amplifier is connected between the transducers as shown in FIG. 3 or between the electrodes as shown in FIG. 4, an acoustic wave collinear with the light wave is set up in the anisotropic material. The acoustic wave is at a frequency dependent on the resonances of the material and is equal to $$f_r = \frac{v}{2L} N = f_a \quad (7)$$

where $v$ is the acoustic velocity, L is the length of the material, and N is an integer. In FIG. 3 those parts which have the same function as parts in FIG. 1 and FIG. 2 have the same number designation but are marked with a double prime. The incident light in FIG. 3 is passed through polarizer 10 into the anisotropic material 20''. As mentioned in connection with FIG. 1, it is necessary to either have the light enter the material at a refraction angle or surround the system with an index matching material.

The anisotropic material has receiving transducer 31 and driving transducer 32 attached to opposite ends of it. The amplifier 70 has its input connected to the receiving transducer and its output connected to the driving transducer. This arrangement oscillates at one of the resonances of the material. In effect, it is an oscillator with the material acting as the feedback path. The longitudinal waves generated by the driving transducer are converted into shear waves at the inclined surfaces of the material. These shear waves which are collinear with the light waves cause the light with the proper frequency to be rotated to an orthogonal polarization. This allows the proper frequency light waves to pass through analyzer 50''.

Located along the length of the material on opposite sides are electrodes which electrically induce changes in the birefringence of the material in response to voltage source 60''. The electrodes are represented by element 61'' in FIG. 3. The output frequency for this arrangement from Equations 4 and 7 is $$f_o = \frac{c}{2Ln_3^3 r_{22} E_2} N \quad (8)$$

where $c$ is the velocity of light in a vacuum, L is the length of the material, $n_3$ is the index of refraction of the material along the length, $r_{22}$ is the electro-optic coefficient, E is the ratio of the voltage of source 60'' to the distance between the electrodes, and N is an integer.

FIG. 4 is the same as FIG. 3 except that transducers 31 and 32 are replaced by electrodes 41''', 42''', 43 and 44. The parts of FIG. 4 which have the same function as parts in FIG. 2 and FIG. 3 have the same number designation but are marked with a triple prime. This arrangement takes advantage of the first part of Equation 5 by using the piezoelectric coefficient to excite $\xi_5$.

Regardless of the method used to generate the acoustic wave, the amplitude of the shear wave $\xi_5$ determines the filter transmission $$T = \Gamma^2 L^2 \frac{\sin^2[\alpha^{1/2}L]}{\alpha L^2} \quad (9)$$

where $$\alpha = \Gamma^2 + \frac{\Delta k^2}{4} \quad (10)$$

$$\Gamma = \frac{2\pi n^3 p_{14}}{4\lambda_o} \xi_5 \quad (11)$$

$\Delta k$ is the difference in the optical k vectors, $p_{14}$ is the photoelastic coefficient, $n$ is the index of refraction and $\lambda_o$ is the wavelength of light in a vacuum. When $$\Gamma L = \frac{\pi}{2}$$

the transmission is 100 percent. The voltage required to produce the shear wave for nonresonant operation under these conditions is determined by Equations 6 and 11 and is $$V_1 = \frac{B}{L} \frac{\lambda_o}{n^3 p_{14} d_{15}} \quad (12)$$

where B is the distance between the driving electrodes, and $d_{15}$ is the piezoelectric coefficient. For resonant operation the voltage required is reduced by $1/Q$, where Q is the quality of the material.

While the invention has been particularly shown and described with reference to preferred embodiments thereof, it will be understood by those skilled in the art that various changes in form and details may be made therein without departing from the spirit and scope of the invention.

I claim:

1. A voltage tunable acousto-optical filter for filtering a light beam comprising:
   a member of anisotropic acousto-optic material;
   means for linearly polarizing the light beam and transmitting the polarized light through said member of acousto-optic material;
   means for producing an acoustic wave, collinear with the light beam in said member;
   analyzing means for analyzing the light beam after transmission through said member and for transmitting only that portion of the beam having a specific polarization relative to the polarization of the light beam introduced into said member;
   and means for selectively determining the frequency of the light beam transmitted by said analyzing means comprising means for varying the birefringence of said member of acousto-optic material by changing the index of refraction in the direction along which the polarized light is traveling.

2. A filter as claimed in claim 1 wherein said acousto-optic material is a crystal of the 3M class.

3. A filter as claimed in claim 2 wherein said material is lithium niobate.

4. A filter as claimed in claim 1 wherein said means for varying the birefringence of said member of acousto-optic material comprises:
   two birefringence electrodes for electro-optically inducing a change in the index of refraction in the acousto-optic material, said birefringence electrodes being located along the length and on opposite sides of said acousto-optic material;
   and a variable voltage source connected between said birefringence electrodes.

5. A filter as claimed in claim 1 wherein said means for producing an acoustic wave comprises an electro-acoustic transducer for introducing acoustic waves into said member, said transducer being located adjacent the end of said member through which the light beam is introduced, the surface of said end being at such an angle to the direction of propagation of the acoustic wave introduced by said transducer as to cause reflection of the acoustic wave in a direction collinear with the light beam in said member.

6. A filter as claimed in claim 1 wherein said means for producing an acoustic wave comprises two driving electrodes on one end of said member of acousto-optic material and an electronic oscillator attached to said electrodes.

7. A voltage tunable acousto-optical filter for filtering a light beam comprising:
   a member of anisotropic acousto-optic material having first and second ends;
   means for linearly polarizing the light beam and passing the polarized light into the first end of said member;
   means for producing an acoustic wave collinear with the light beam in said member in response to a first signal;
   means for receiving the acoustic wave in said member and producing a second signal therefrom;
   means for amplifying the second signal to produce the first signal and applying the first signal to said means for producing an acoustic wave;
   means for analyzing the light beam after it exits through the second end of said member and transmitting only that portion of the beam having a specific polarization relative to the polarization of the light beam introduced into the first end of said member;
   and means for selectively determining the frequency of the light beam transmitted by said analyzing means comprising means for varying the birefringence of said member of acousto-optic material by changing the index of refraction in the direction along which the polarized light is traveling.

8. A filter as claimed in claim 7 wherein said means for producing an acoustic wave comprises two driving electrodes adjacent the first end of said acousto-optic material.

9. A filter as claimed in claim 7 wherein said means for receiving an acoustic wave comprises two receiving electrodes adjacent the second end of said acousto-optic material.

10. A filter as claimed in claim 7 wherein said means for producing an acoustic wave comprises a first electro-acoustic transducer for introducing acoustic waves into said material, said first transducer being located adjacent the first end of said material, the surface of said first end being at such an angle to the direction of propagation of the acoustic wave introduced by said transducer as to cause reflection of the acoustic wave in a direction collinear with the light beam in said member.

11. A filter as claimed in claim 10 wherein said means for receiving an acoustic wave comprises a second electro-acoustic transducer located adjacent the second end of said material, the surface of said second end being at such an angle to the direction of propagation of the collinear light and acoustic waves as to cause reflection of the acoustic wave towards said second transducer.

12. A filter as claimed in claim 7 wherein said means for varying the birefringence of said member comprises two electrodes located along the length of said member on opposite sides of it for electro-optically inducing a change in the index of refraction in the acousto-optic material and a variable voltage source connected between said electrodes.

References Cited

UNITED STATES PATENTS

| | | | |
|---|---|---|---|
| 3,560,955 | 2/1971 | Hallman | 350—161 X |
| 3,330,956 | 7/1967 | Wade | 250—161 X |
| 3,431,504 | 3/1969 | Adler | 307—88.3 |

OTHER REFERENCES

Harris et al.: "Acoustic-Optic Tunable Filter," J.O.S.A., vol. 59, No. 6 (June 1969), pp. 744–741.

Harris et al.: "CaMoO$_4$ Electronically Tunable Optical Filter," App. Phys. Lett., vol. 17, No. 5 (9/1/70), pp. 223–225.

DAVID SCHONBERG, Primary Examiner

P. R. MILLER, Assistant Examiner

U.S. Cl. X.R.

350—150, 157, 161